(12) United States Patent
Chay

(10) Patent No.: US 11,747,647 B2
(45) Date of Patent: Sep. 5, 2023

(54) ENDPIECE ASSEMBLIES FOR EYEGLASSES

(71) Applicant: Edward Chay, Fairfax, VA (US)

(72) Inventor: Edward Chay, Fairfax, VA (US)

( * ) Notice: Subject to any disclaimer, the term of this patent is extended or adjusted under 35 U.S.C. 154(b) by 196 days.

(21) Appl. No.: 17/323,874

(22) Filed: May 18, 2021

(65) Prior Publication Data

US 2021/0356762 A1 Nov. 18, 2021

Related U.S. Application Data

(60) Provisional application No. 63/054,082, filed on Jul. 20, 2020, provisional application No. 63/026,553, filed on May 18, 2020.

(51) Int. Cl.
*G02C 5/10* (2006.01)
*G02C 5/14* (2006.01)

(52) U.S. Cl.
CPC .............. *G02C 5/146* (2013.01); *G02C 5/10* (2013.01); *G02C 2200/02* (2013.01)

(58) Field of Classification Search
CPC ...... G02C 5/146; G02C 5/10; G02C 2200/02; G02C 2200/08; G02C 5/2209
See application file for complete search history.

(56) References Cited

U.S. PATENT DOCUMENTS

| | | | | |
|---|---|---|---|---|
| 5,418,581 A | * | 5/1995 | Conway | G02C 5/2209 351/116 |
| 6,089,707 A | * | 7/2000 | Shapiro | G02C 9/00 351/57 |
| 2003/0086052 A1 | * | 5/2003 | Zelman | G02C 1/04 351/47 |
| 2012/0224260 A1 | * | 9/2012 | Healy | G02C 5/10 359/464 |

(Continued)

FOREIGN PATENT DOCUMENTS

| | | | | |
|---|---|---|---|---|
| CN | 206133126 U | * | 4/2017 | ............ B43K 25/00 |
| KR | 1020080096972 A | * | 11/2008 | |
| WO | WO-2011149364 A1 | * | 12/2011 | ............... G02C 1/08 |

OTHER PUBLICATIONS

Best Eyeglass Hinges for Comfortable and Durable Glasses, (2012), pp. 1-5 [online], [retrieved on Dec. 30, 2022], retrieved from the Internet <URL: https://www.perfect-eyeglasses-guide.com/eyeglass-hinges.html >. (Year: 2012).*

*Primary Examiner* — Thomas K Pham
*Assistant Examiner* — Wesley Scott Ashton
(74) *Attorney, Agent, or Firm* — Chernoff, Vilhauer, McClung & Stenzel, LLP

(57) ABSTRACT

Endpiece assemblies for eyeglass frames and eyeglasses are shown and disclosed. In one embodiment, the endpiece assembly includes an elongate body having a channel partially defined by an elongate bottom wall of the elongate body. The elongate body adapted to be attached to, or formed with, a temple of the eyeglass frame. The endpiece assembly additionally includes an intermediate member having first and second end portions and a first central portion therebetween. The first central portion and the second end portion are received in the channel and the first end portion adapted to connect to a connecting bar of the frame front of the eyeglass frame. The endpiece assembly further includes a first plurality of magnets disposed within the channel.

14 Claims, 10 Drawing Sheets

(56) References Cited

U.S. PATENT DOCUMENTS

| | | | |
|---|---|---|---|
| 2015/0338678 A1* | 11/2015 | Fafaul | G02C 1/06 |
| | | | 351/86 |
| 2016/0033790 A1* | 2/2016 | Young | G02C 5/2209 |
| | | | 351/114 |
| 2018/0252938 A1* | 9/2018 | Thorsell | G02C 5/22 |

* cited by examiner

ENDPIECE ASSEMBLIES FOR EYEGLASSES

CROSS REFERENCE TO RELATED APPLICATIONS

This application claims benefit of U.S. Provisional Application No. 63/026,553 filed May 18, 2020 and U.S. Provisional Application No. 63/054,082, filed Jul. 20, 2020, the entire disclosures of which is hereby incorporated herein by reference for all purposes.

BACKGROUND OF THE INVENTION

The present invention generally relates to end piece assemblies for eyeglass frames, where the frame front and temples of the eyeglass frames are connected via the end piece assemblies without the use of extraneous or exterior fastener components, to allow the eyeglasses to hold its shape and alignment when in use, and when in folded storage.

A large number of the population wear eyeglasses. Even though many users need to wear eyeglasses for a prolonged period of time throughout their lives, oftentimes the lifespan of eyeglasses and eyewear themselves are quite short, given that the materials are prone to breakage and wear and tear. Many eyeglasses are designed to be light weight to increase the comfort of the user, and prevent slippage of the frames on the user's face. However, use of lightweight materials also make the frames delicate and prone to damage.

Generally, an eyeglass frame will include a frame front, along with two temples connecting to the frame front. Typically, the temples are connected to the frame front through endpieces with screws, hinges, and other exterior or extraneous fasteners. An issue regarding these types of fasteners is that the fastener tends to easily break with use as they functionally serve as a hinge and are subject to constant action and pressure. The various components forming the fastener may shift or loosen over time with repeated use as the user often bends and holds the frame at the locale of the fastener to wear or remove the eyeglass, leading to a less secure connection of the temples with the endpieces and/or the endpieces with the frame front. A user may have to use appropriate tools to manually tighten the fastener, to prevent the fasteners from falling out from the connecting point. Unbeknownst to the user, a looser connection between the temples with the endpieces and/or the endpieces with the frame front will also lead to greater user discomfort, as the temples will lose their clamping ability to sit properly on a user's temples and ears. If adjusted too tightly, the temples may cause unwanted tension to the side of the head and lead to headaches. A loose fastener may also contribute to the loss of alignment between the temples and the frame front when the eyeglasses are in a folded position for storage. Finally, there is a risk that the fastener will simply become lost, causing great inconvenience to a user.

Oftentimes, a user may have to purchase multiple pairs of eyeglasses to suit different types of use, such as sports, outdoor, work, crafting and other activities. Given that conditions may vary greatly, what may be appropriate for a particular type of activity may not work well for another. As such, a user may often carry around multiple pairs of eyeglasses so as to switch out the glasses accordingly. This may result in both economic and material waste, in addition to the user having to carry more items around. Having an option where the user can easily switch out frames and/or end pieces to suit the particular need at the moment allows a user to be flexible and sustainable.

What is desired, therefore, is an endpiece assembly that includes a self-adjusting fastener that can connect the temples and the frame front, without the use of extraneous or exterior fastener components, that will allow the eyeglasses to hold and retain its shape over time when placed on a user's face, will not lose its shape or alignment when the eyeglasses are folded for storage, will self-adjust to a nominal position if the endpiece or frame front is over-extended, is easy to maintain and care for, reduces likelihood of wear and tear, and remains cost-efficient and flexible for various types of use.

BRIEF DESCRIPTION OF THE DRAWINGS

For a better understanding of the invention, and to show how the same may be carried into effect, reference will now be made, by way of example to the accompanying drawings, which.

DETAILED DESCRIPTION OF PREFERRED EMBODIMENTS

Figure 1:
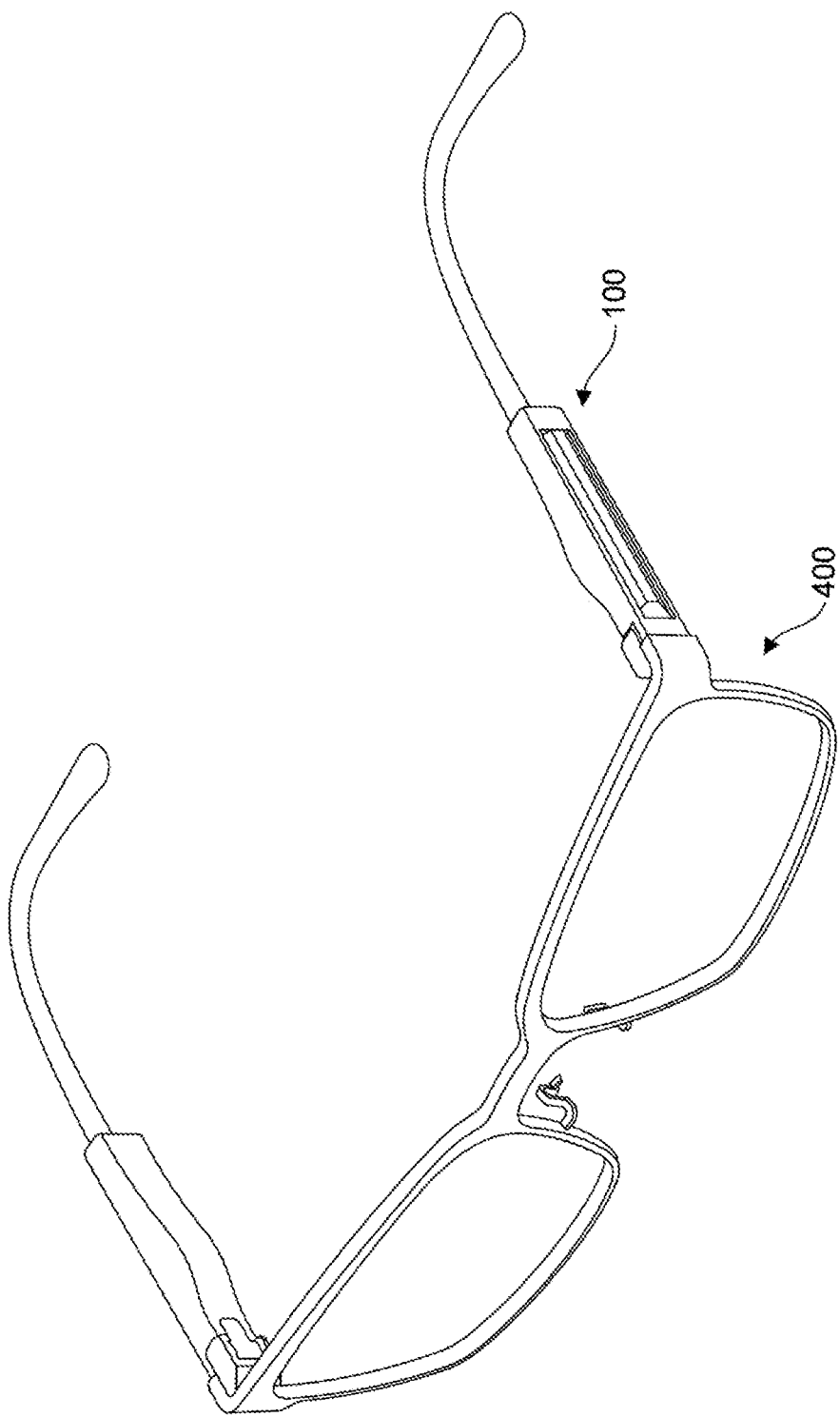
FIG. 1 shows an isometric view of an illustrative embodiment of an endpiece assembly integrated between a frame front and a pair of temples of an eyeglass frame.
Figure 2:
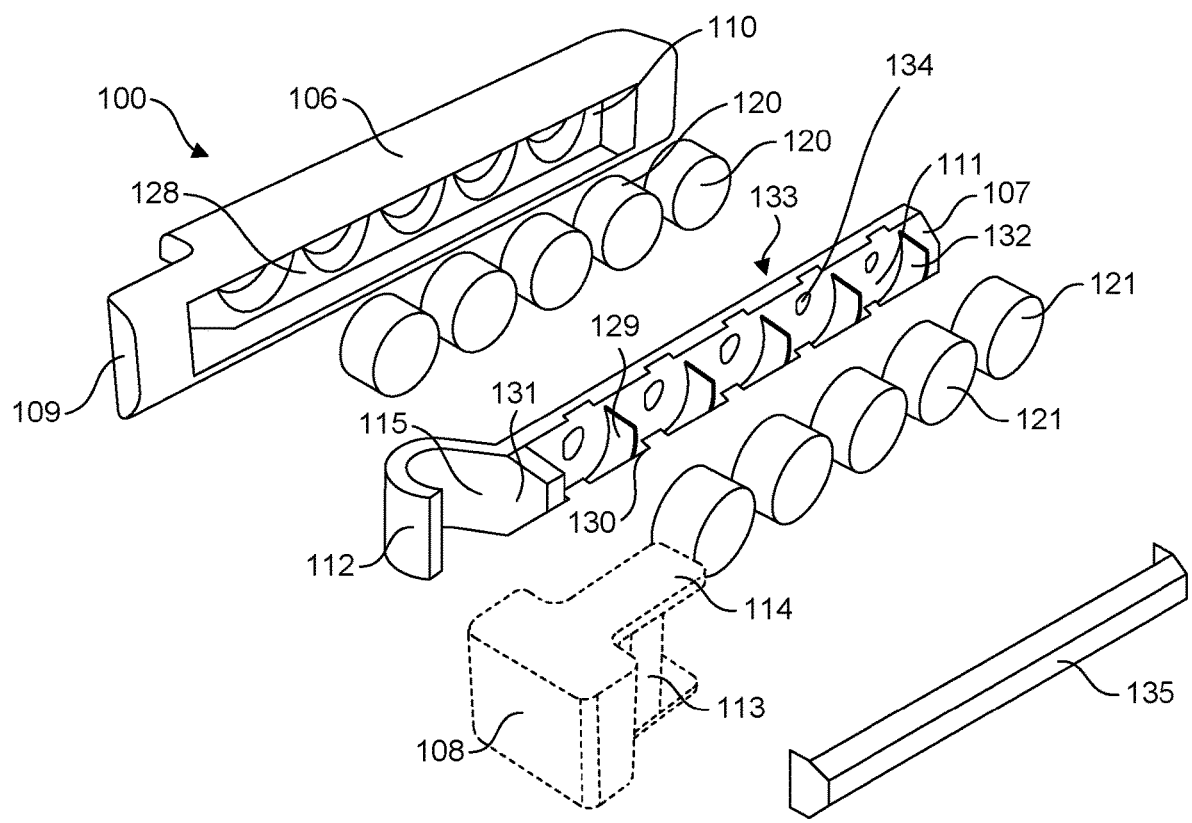
FIG. 2 shows an exploded view of the endpiece assembly of FIG. 1.
Figure 3:
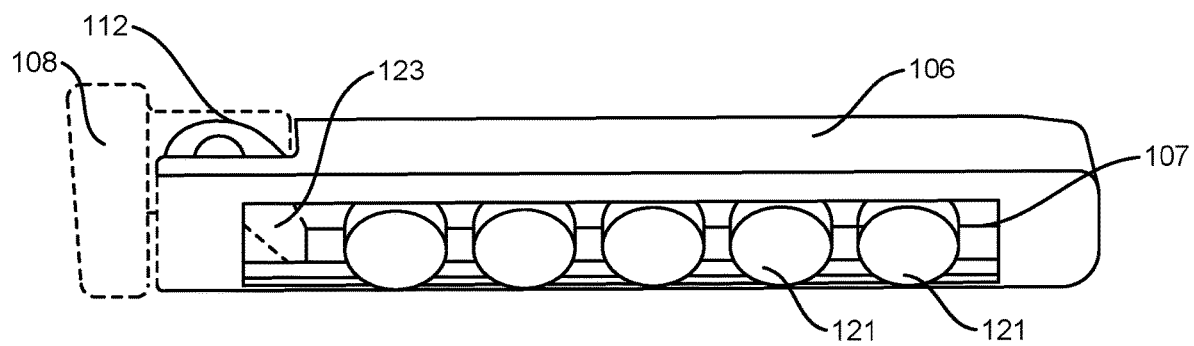
FIG. 3 shows an isometric view of the endpiece assembly of FIG. 1.
Figure 4:
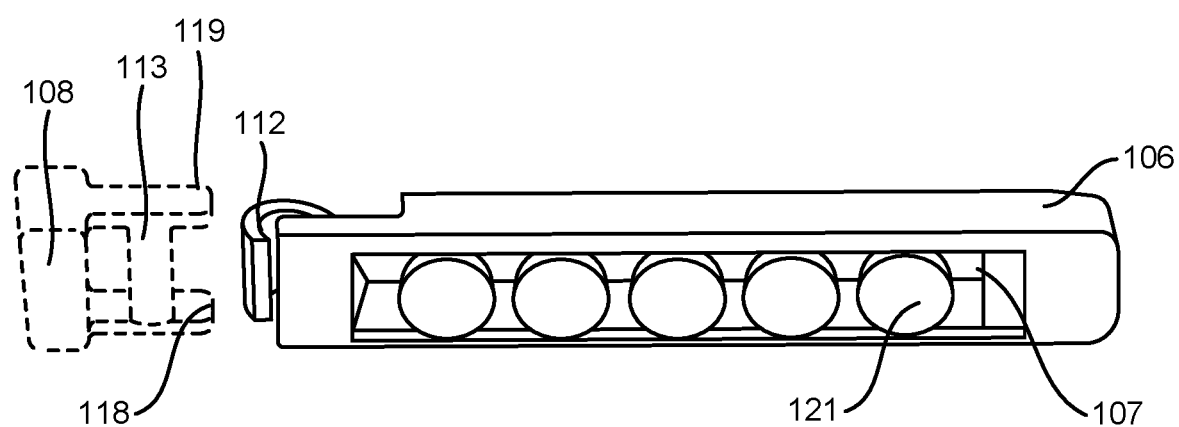
FIG. 4 shows the assembly of FIG. 3 detached from a connecting bar of a frame front.
Figure 5:
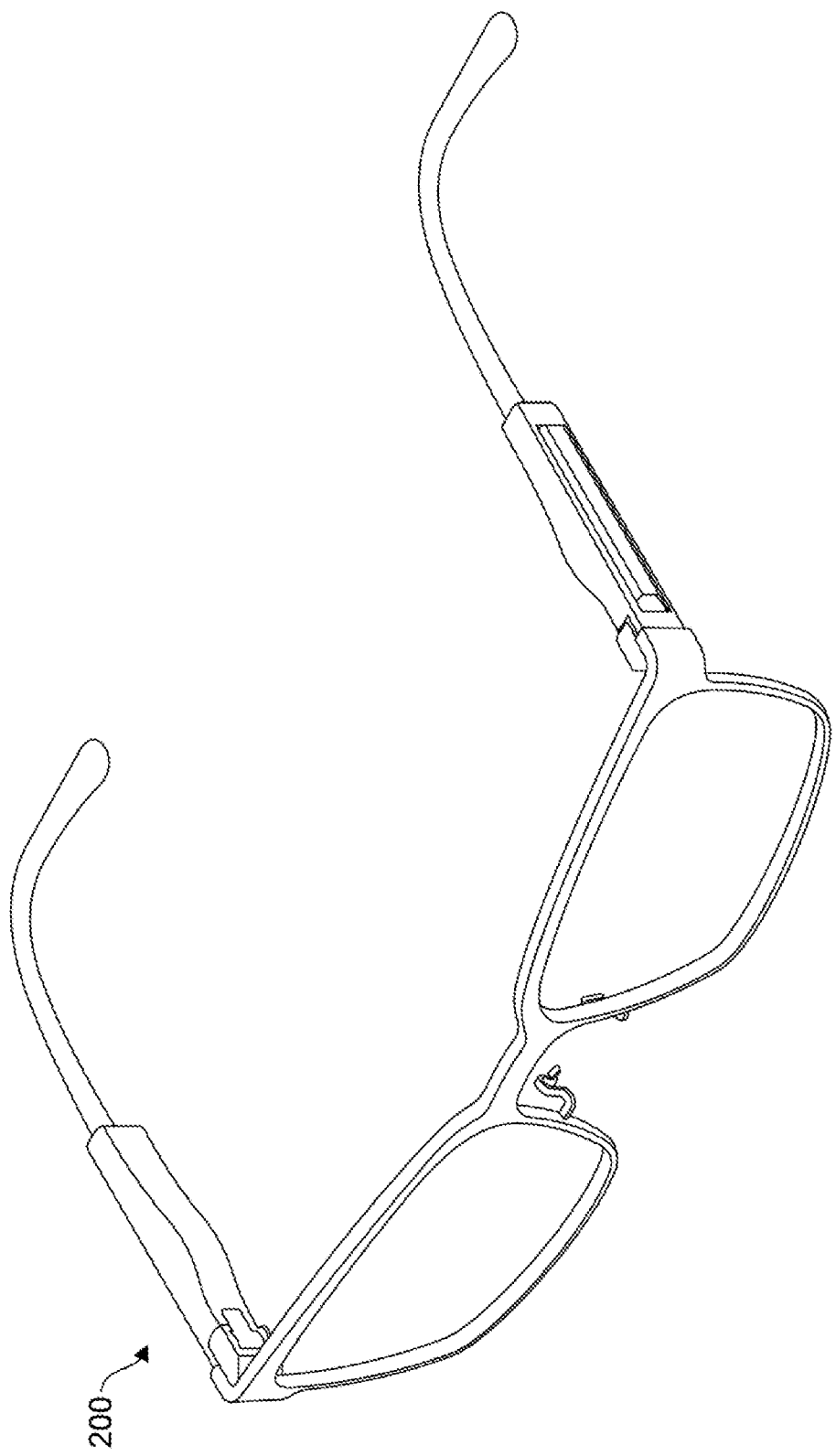
FIG. 5 shows an isometric view of an additional embodiment of an endpiece assembly integrated between a frame front and a pair of temples of an eyeglass frame.

Referring to FIGS. 1-4, an illustrative example of a side hinge endpiece assembly or fastener assembly 100 is shown, where the fastener or endpiece assembly serves to connect the temples and the frame front of the eyeglasses 400, as shown in FIG. 1. The fastener assembly is comprised of an elongate body 106 including an elongate bottom wall 128, where the elongate body may be adapted to be attached to, or formed with, a temple of the eyeglass frame. The fastener assembly also includes an intermediate member 107 with first 131 and second end 132 portions and a first central portion 133 in between the end portions. As shown in FIGS. 3 and 4, in a preferred embodiment, much of the intermediate member 107 (such as the central portion and one of the end portions) may be installed to or fitted within the body 106, and on an opposing end of the body and intermediate member, the connector 108 that is part of the frame front may be selectively attached and engaged with the intermediate member.

As shown in FIG. 2, the elongate body 106 may have a channel 110 throughout the central portion of the body, which may be defined at least partially by a bottom wall 128 and a marginal edge 109 on its opposing end. As shown in FIGS. 3-4, there may be an opening or hole 123 adjacent to the marginal edge 109. The marginal edge 109 may have a width that is less in comparison to the width of the opposing end of the body 106, to make space for additional components or other fastening elements.

In some embodiments, magnets or magnetic members 120 may be placed within the channel 110 and along the bottom wall 128 of the body 106, and there may be additional apertures carved further into the channel 110 to securely hold the magnetic members in place. The channel may be any shape, so long as the dimensions are large enough to permit magnetic members to fit within.

An intermediate member 107 may be installed to or overlaid on top of the magnetic members 120, where the intermediate member may have apertures 134 along bottom wall 128 to allow the magnetic members 120 to correspond and fit accordingly within the intermediate member 107. The central portion 133 of the intermediate member (which may be on the opposing face of the intermediate member where the magnetic members 120 are located) may include a base 130 and a number of spaced walls 129 extending from the base 130, the plurality of spaced walls defining a plurality of recesses or cavities 111 therebetween. Another row of magnets or magnetic members 121 may be placed within the recesses 111. The recesses may be any shape, including circular or rectangular, to hold the magnetic members sufficiently in place and prevent such from falling out easily. In some embodiments, the magnetic members 120 may be placed within the channel and between the bottom wall 128 and the central portion of the intermediate member.

In a preferred embodiment, the magnetic members 120 placed into one side of the intermediate member will have opposite polarities with the set of magnetic members 121 on the opposing side of the intermediate member 107 in face to face abutment. Doing so allows the two rows of magnetic members to attract one another and form a collective strip with the magnetic members on both sides of the intermediate member and the intermediate member being held between. The magnets may be cylindrical in shape, or any other shape that corresponds to the recess. There may be any number of magnetic members placed in the recess, as long as the weight does not overburden the wearer around the temple area.

As shown in FIGS. 2-4, in some embodiments, the first end 131 of the intermediate member 107 may have a hook 112, where the curvature of the hook 112 may form a hole 115. In a preferred embodiment, the hook 112 may have dimensions generally corresponding to the marginal edge 109 of the body 106, so that the hook 112 may easily pass through opening 123 of the body 106, when the intermediate member is placed within the body 106. There may be other components or fastening elements in the assembly 100, such as threaded members.

As shown in FIGS. 3-4, when the magnetic members 120, 121 are assembled together with the intermediate member to form a collective strip and the assembly is placed within the body 106, the marginal edge 109 will align with the hook 112, with the marginal edge 109 overlaying on top of the hook 112 on the first end 131. Together, the marginal edge 109 along with the hole 115 of the hook 112 may form an opening. In a preferred embodiment, the connector 108 may have a flange on its end, and a bar 113 on the other opposing end. The opening formed between hook 112 and first end 131 may be sized to receive bar 113 so that the hook 112 and marginal edge 109 may grip or pivotably connect to the bar 113. There may be protruding portions 118, 119 of the connecting bar that extend past the bar 113, so as to buffer and protect the bar 113 from external impact, breakage and wear and tear.

As shown in FIG. 3, when the fastener assembly is installed and in a nominal position, the connecting bar is selectively attached to the hook 112 of the intermediate member. When pressure is applied to the intermediate member and/or the corresponding magnetic members placed within the central portion 133, the intermediate member may selectively slide towards the direction of the hook 112 along a horizontal axis, parallel to the body 106. Due to the hook 112 being overlaid by the marginal edge 109 of the body 106, when pressure is applied, the hook may extend past the marginal edge at an angle to the body of the intermediate member, resulting in the increase in size of the hole 115 and creating a larger space than when the assembly is in a nominal position. As a result, the increased dimension and space in the hole causes the bar 113 to be released and the connecting bar may be detached from the intermediate member and body.

Given that the magnetic members 120, 121 each possesses opposing polarities when placed in face to face abutment respectively, the two horizontal magnetic member strips possess an attracting force with each other, allowing the members to clamp onto each other with the intermediate member positioned in-between. The attractive force from the opposite polarities of the magnetic members also allows for the intermediate member to easily slide back to its nominal position after pressure is applied. In some embodiments, the intermediate member and body may be partially or fully detachable from the connecting bar, to allow for the intermediate member and body to be switched out.

Referring to FIGS. 5-8, an alternative example of endpiece assembly is shown, which is generally indicated at 200. Endpiece assembly 200 includes magnetic members 221 placed or received in the intermediate member 207, where the intermediate member may have a first and second end portion. Each magnetic member possesses identical polarities when placed in face to face abutment respectively, and as such the magnetic members exert a constant opposing force with one another, similar to a spring member. In some embodiments, a spring or spring member may be used, instead of magnetic members, with the same effect. The magnetic members may be cylindrical, or may be any other shape or profile, so long as the magnetic members are aligned with their identical polarities facing each other.

Figure 6:
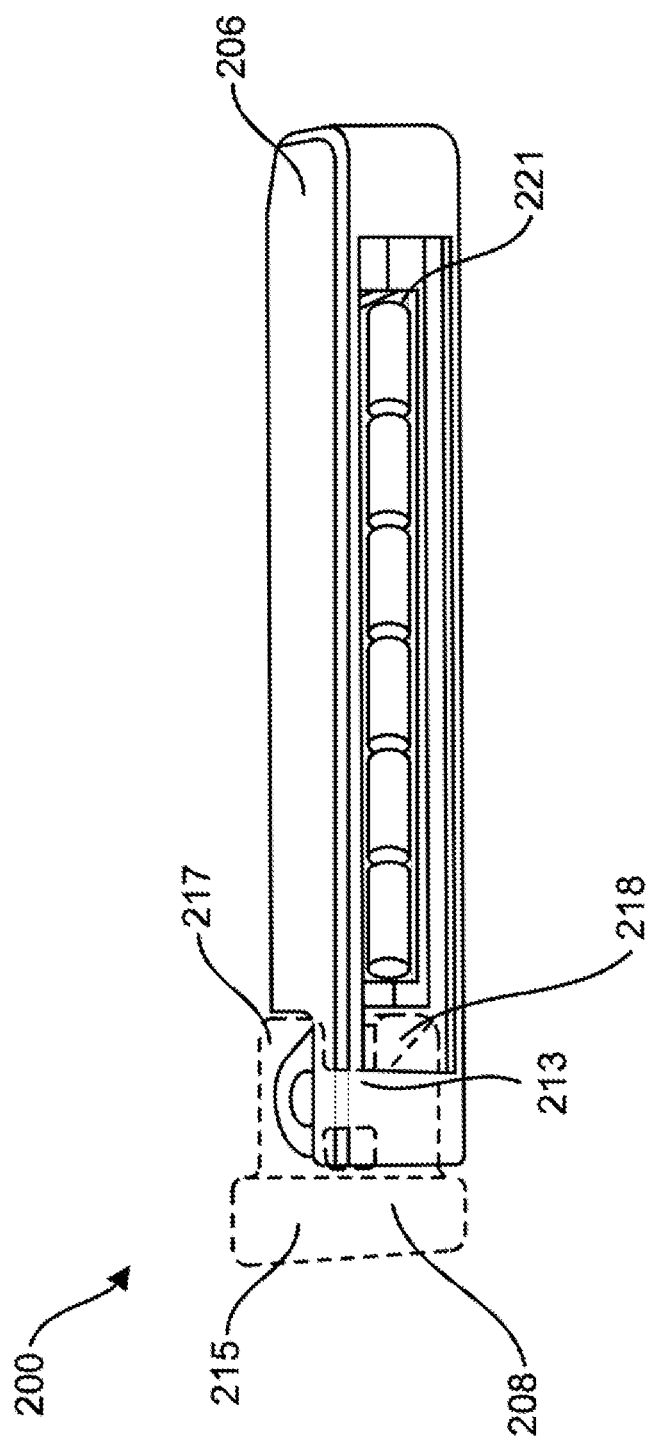
FIG. 6 shows an isometric view of the endpiece assembly of FIG. 5.

As shown in FIG. 6, the fastener assembly 200 is comprised of a body 206 and an intermediate member 207. The fastener assembly 200 is pivotably attached to connector 208 that is part of the frame front. In a preferred embodiment, the connector 208 may have a flange 215 on its end, and a bar 213 on the other opposing end, and the flange and bar may be parallel to one another. In some embodiments, the connector may have rims 217, 218 extending from the top and bottom of the flange, the rims 217, 218 being parallel to one another, and generally perpendicular with the flange. The dimension of the flange 215 may vary, so long as the flange does not interfere with the installation of the intermediate member and the body.

In a preferred embodiment, the body may have a marginal edge 209 and an aperture 210 with dimensions corresponding to the intermediate member 207, to allow for the intermediate member to fit within the aperture of the body. The intermediate member 207 has a channel, a hook 212 and a hole 211 that corresponds in dimension to the magnetic members 221 to allow the member to securely fit in the hole. There may be any number of spring members placed in the recess, as long as the weight of the spring does not overburden the wearer. When the magnetic members 221 are assembled and placed in the intermediate member 207, and the intermediate member 207 is assembled in the body, the hook 212 may be overlaid by the marginal edge 209, so that the hook 212 forms a hole or opening together with the marginal edge 209, allowing the connecting bar 208 to latch onto the hook member 212 through its bar 213 and form a connection.

Figure 7:
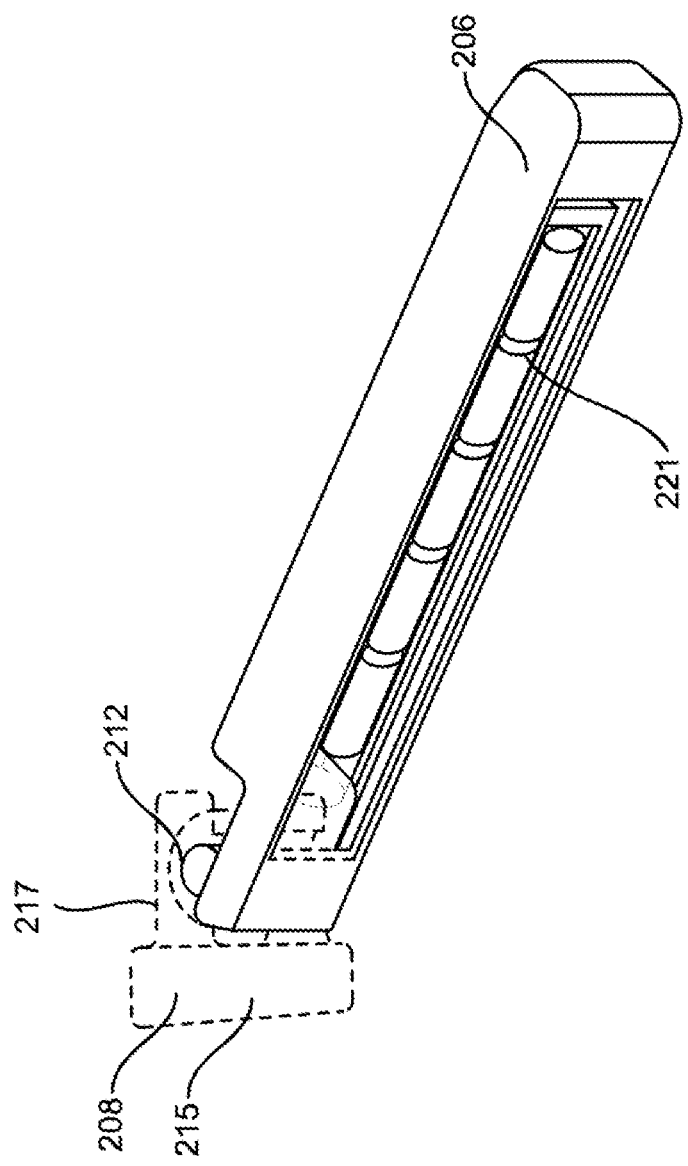
FIG. 7 shows another isometric view of the endpiece assembly of FIG. 5.
Figure 8:
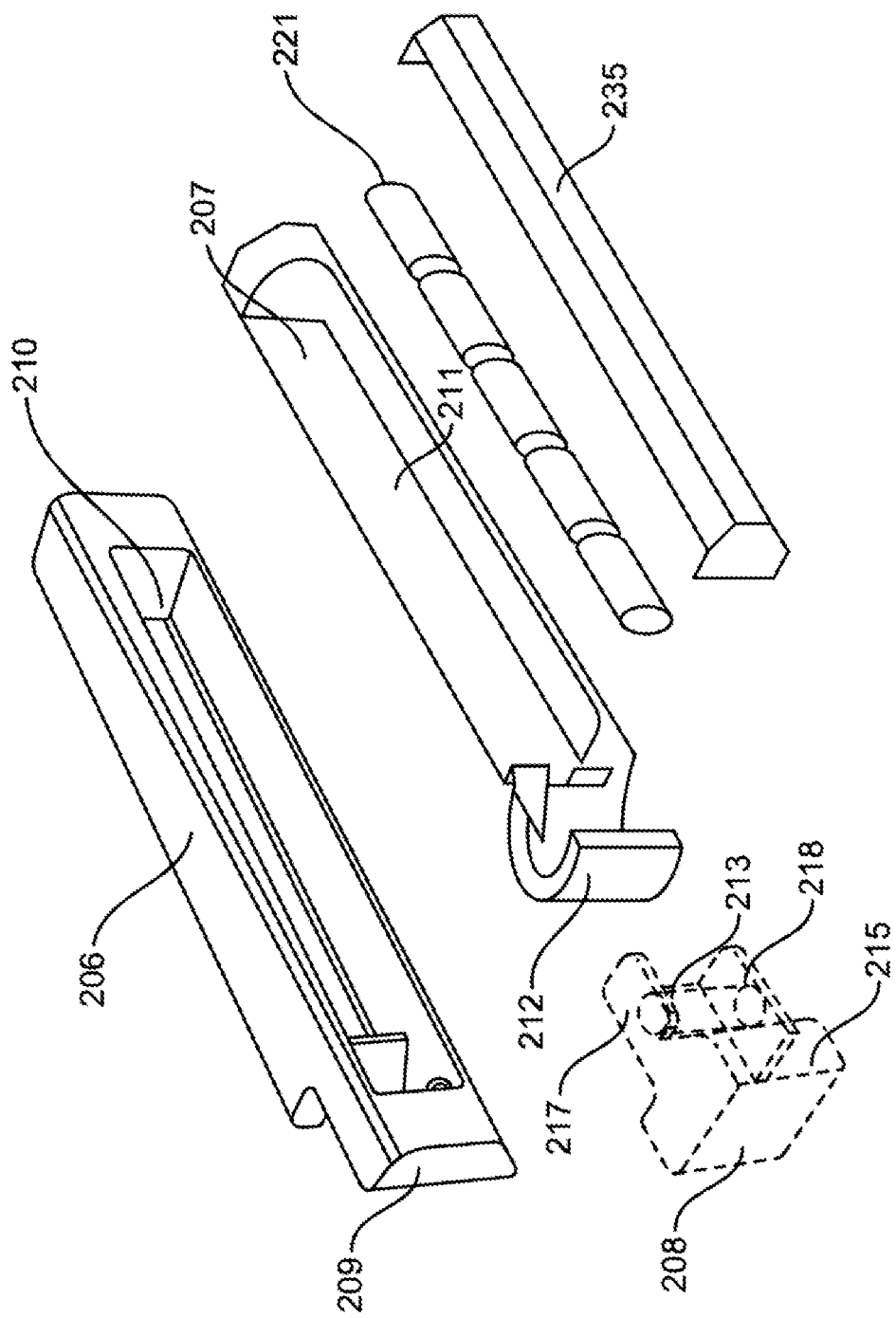
FIG. 8 shows an exploded view of the endpiece assembly of FIG. 5.

As shown in FIGS. 6-8, upon application of sliding pressure in the direction of the hook 212, the magnetic members 221 and/or the intermediate member 207 may be pushed in a horizontal direction parallel to the body, allowing the hook 212 to extend at an angle past the marginal edge 209, creating additional space between the hook 212 and the bar 213 of the connector 208, detaching the connector 208 from the body 206. Upon release of the sliding pressure, due to the alignment of the magnetic members 221, the identical polarities of the members in face to face abutment will create a tension akin to a spring member, and will force the intermediate member 207 to spring back into its nominal position, causing the hook 212 to slide back into its initial position, where the hook is parallel to and overlays the marginal edge 209. In some embodiments, the position of the rims 217, 218 directly over the hook and bar 213 may protect both from external forces, help protect the connection and assembly from unexpected impact, further prolong the overall durability of the assembly.

In some embodiments, there may be an additional cover, such as 135 in FIGS. 2 and 235 in FIG. 7, installed onto the intermediate member, to add to protection of the body and prevent either magnetic members or the spring members from being dislocated when the body and intermediate member are assembled. Additionally, the intermediate member may be covered by a button on one opposing end, so that upon applying pressure, the button will exert a horizontal force and cause the intermediate member to slide in a horizontal direction, allowing the hook to extend past the body, causing the release of the connecting bar, similar to assembly 100.

Figure 9:
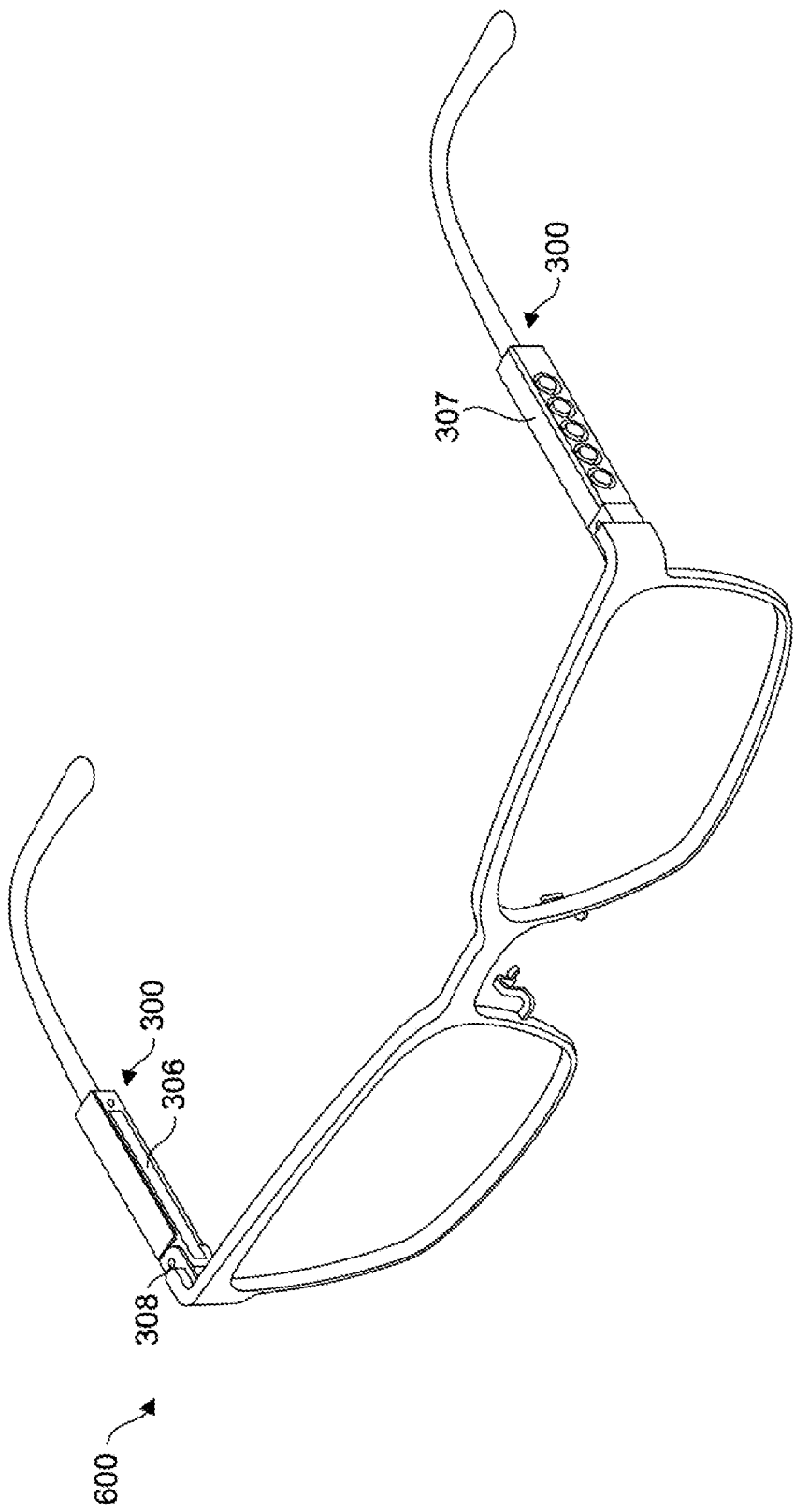
FIG. 9 shows an isometric view of a further embodiment of an endpiece assembly integrated between a frame front and a pair of temples of an eyeglass frame.
Figure 10:
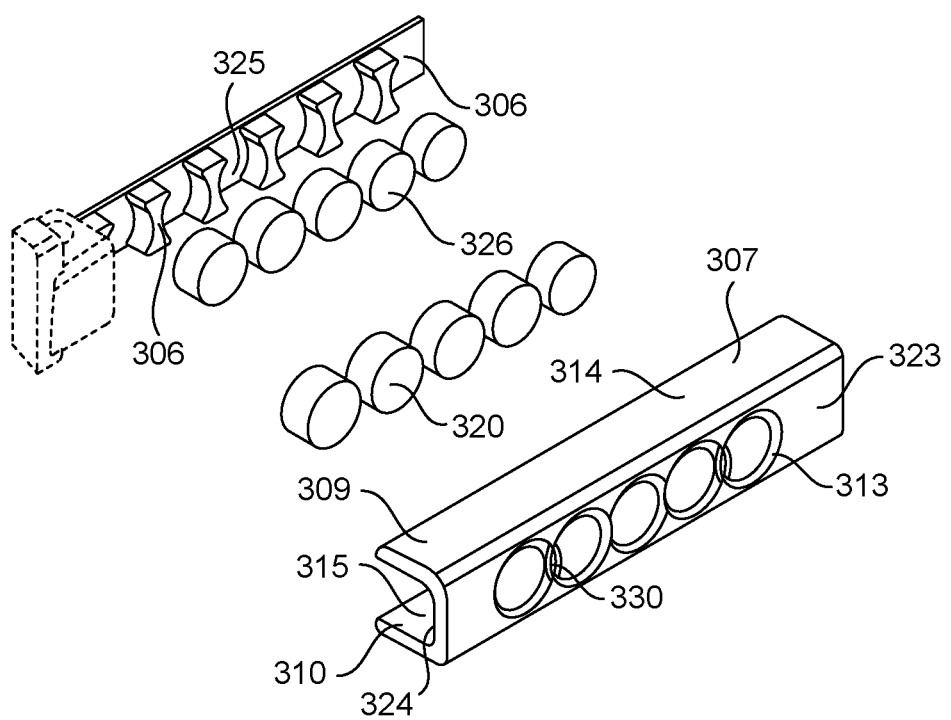
FIG. 10 shows a partially exploded view of the endpiece assembly of FIG. 9.

Referring to FIGS. 9-10, an alternative example of a fastener or endpiece assembly 300 is shown, where the fastener assembly is comprised of a intermediate member 306 and a body 307. The fastener assembly 300 is pivotably attached to connector 308 that is part of the frame front. As shown in FIGS. 9-10, in a preferred embodiment, the connector 308 may be securely integrated or installed with the temples of the eyeglasses 600, such that the bar may not be removed or exposed when the eyeglass frame is in use. In a preferred embodiment, the intermediate member 306 may have a number of cavities 325 aligned along its length.

As shown in FIGS. 9-10, the body 307 may an exterior facing side 323, and an interior, temple-facing side 324, where the interior side 324 has a channel 310 throughout and a pair of curved lips 309, 310 on the distal end of the body 307 located adjacent to the bar 308 when assembled. As shown in FIGS. 9-10, the intermediate member 306 may have a width and height that is less than the width and height of the sliding body 307, such that the interior side 324 of the body may be assembled with the intermediate member so as to enclose the body. The interior side 324 may also include a top 314 and bottom ledge 315, where the ledge extends towards the distal end of the body and is connected to the top 309 and bottom lip 310 at the opposing distal end. As shown in FIG. 10, the top and bottom ledge 314 and 315 may partially enclose the recess 310, so as to provide a guide path for the intermediate member 306 when the body and body are assembled. The curved lips 309, 310 allow the body 307 to close over the intermediate member 306 and fit seamlessly with the connector 308 embedded in the frame front.

In some embodiments, the sliding body 307 may be defined at least partially by a bottom wall and a channel 310, and the channel may further include a series of apertures 313 formed by a number of columns 330 in between. In a preferred embodiment, a series of magnets or magnetic members 320 may be placed within the channel 310, corresponding to the apertures 313 within. The location and dimension of the apertures 313 in the body 307 may correspond to the cavities 325 on the intermediate member 306, to facilitate proper alignment of the magnetic members. The channel and the apertures may be any shape, so long as the dimensions are large enough to permit magnetic members to fit within. An additional row of magnets or magnetic members 326 may be placed into the apertures 325 of the intermediate member. The columns 330 separating the apertures 313 may partially overlay some of the magnetic members 320, so as to serve as a guard and prevent the magnetic members from falling out of the assembly.

In a preferred embodiment, the magnetic members 320 placed into one side of the body will have opposite polarities with the set of magnetic members 326 within the intermediate member 306 when the magnets are in face to face abutment. Doing so allows the two rows of magnetic members to attract one another and form a collective strip with the magnetic members within the intermediate member and the body. The magnets may be cylindrical in shape, or any other shape that corresponds to the recess. There may be any number of magnetic members placed in the recess, as long as the weight does not overburden the wearer around the temple area.

Given that the magnetic members 320, 326 each possesses opposing polarities when placed in face to face abutment respectively, the two horizontal magnetic member strips possess an attracting force with each other, allowing the intermediate member and the body to clamp onto each other. As such, a user may simply detach the side hinge endpiece assembly 300 from the eyeglass frame when he or she desires. The attractive force from the opposite polarities of the magnetic members further allows the intermediate member and the body to easily slide back to a nominal position. By utilizing the force of magnetic members, along with the integrated bar design, a user may easily switch out the temples and frame of the eyeglasses depending on intended use or desired style.

Compared to a regular frame, the assemblies 100, 200, and 300 function as a greatly improved spring mechanism, providing greater comfort for the wearer between the temples, while also facilitating a durable connection between the side members and/or side piece and the frame. Finally, the assemblies and their components may be independently assembled into or attached to other components of the eyeglass frame, or may be partially or fully integrally molded or formed with the frame front and/or temples of the eyeglass frame, so that a user may easily switch out the side member (and/or temples) and/or the frame member (and/or frame front), depending on activity or preference. Although three embodiments are shown in FIGS. 1-10 and described above, each embodiment may additionally, or alternatively, include one or more components from one or more of the other embodiments. For example, the recess of the elongate body of assembly 100 may be larger to additionally include intermediate member and magnets of assembly 200.

Thus as may further be seen from the disclosure herein, an embodiment of this disclosure of an endpiece assembly for an eyeglass frame, comprising an elongate body having a channel partially defined by an elongate bottom wall of the elongate body, the elongate body being adapted to be attached to, or formed with, a temple of the eyeglass frame; an intermediate member having first and second end portions and a central portion therebetween, the central portion and the second end portion being received in the channel and the first end portion adapted to connect to a connecting bar of the frame front of the eyeglass frame; and a first plurality of magnets disposed within the channel and between the bottom wall and the first central portion and the second end portion of the intermediate member; in which the first end portion further includes a marginal edge having a width less than the width of the second end portion; in which a through hole is adjacent to the marginal edge; in which the marginal edge is substantially parallel and adjacent to a hook when the intermediate member is enclosed within the body; in which the marginal edge overlays the hook when the intermediate member is enclosed within the body; in which the channel in the second central portion further defines apertures corresponding to the shape of the magnetic members; in which the magnetic members being aligned adjacent to one another in the respective channels, where the first and second plurality of magnetic members possess opposite polarities when placed in face to face abutment respectively; in which the magnetic members are aligned such that the members possess identical polarities to one another when placed in face to face abutment respectively; wherein the intermediate member has a cover overlaying the magnetic members.

Thus as may further be seen from the disclosure herein, an embodiment of this disclosure of an endpiece assembly for an eyeglass frame, comprising an elongate body having first and second end portions and a first central portion therebetween, the first central portion having a series of apertures throughout; a body having third and fourth end portions and a second central portion therebetween, the third end portion having a pair of curved lips sized to overlay a connecting bar of the eyeglass frame, the second central portion having a channel, and the first and second end portions, and first central portion being sized to be received in the channel; and a plurality of magnetic members received in the second central portion; in which a second plurality of magnets are received in the apertures of the first central portion; in which the channel in the second central portion further defines apertures corresponding to the shape of the magnetic members; in which the magnetic members received in the apertures of the body possess opposite polarities to the magnetic members received in body, when the magnetic members are in face to face abutment respectively; and wherein the body has a layer atop the magnetic members.

It will be appreciated that the invention is not restricted to the particular embodiment that has been described, and that variations may be made therein without departing from the scope of the invention as defined in the appending claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. An endpiece assembly for an eyeglass frame, comprising:
   (a) an elongate body having a channel partially defined by an elongate bottom wall of the elongate body, the elongate body being adapted to be attached to, or formed with, a temple of the eyeglass frame;
   (b) an intermediate member having first and second end portions and a first central portion therebetween, the first central portion and the second end portion being received in the channel and the first end portion adapted to connect to a connecting bar of a frame front of the eyeglass frame; and
   (c) a first plurality of magnets disposed within the channel, wherein the elongate body includes third and fourth end portions and a second central portion therebetween, the third end portion including a hole and the second central portion having the channel, and wherein the first end portion is shaped as a hook, at least a portion of the hook being received in the hole.

2. The assembly of claim 1, wherein the first end portion and the third end portion define an opening therebetween, the opening being sized to receive a connecting bar of the frame front of the eyeglass frame.

3. The assembly of claim 1, wherein the first plurality of magnets is disposed between the bottom wall and the first central portion and the second end portion of the intermediate member.

4. The assembly of claim 3, wherein the first central portion of the intermediate member includes a base and a plurality of spaced walls extending from the base, the plurality of spaced walls defining a plurality of cavities therebetween, and further comprising a second plurality of magnets received in the plurality of cavities, the intermediate member being disposed between the first and second pluralities of magnets.

5. The assembly of claim 4, wherein polarities of the first and second plurality of magnets are opposite such that the first and second plurality of magnets attract each other.

6. The assembly of claim 1, wherein the bottom wall of the channel includes a plurality of apertures and the first plurality of magnets are received in the plurality of apertures.

7. The assembly of claim 6, wherein the first central portion of the intermediate member includes a base and a plurality of spaced walls extending from the base, the plurality of spaced walls defining a plurality of cavities therebetween, and further comprising a second plurality of magnets received in the plurality of cavities, the intermediate member being disposed between the first and second pluralities of magnets.

8. The assembly of claim 7, wherein polarities of the first and second plurality of magnets are opposite such that the first and second plurality of magnets attract each other.

9. The assembly of claim 1, wherein the first central portion and the second end portion of the intermediate member include a base, the first central portion including a first end wall that is adjacent to the first end portion and that extends from the base, the second end portion including a second end wall that extends from the base, and wherein the first plurality of magnets is disposed between the first and second end walls.

10. The assembly of claim 9, wherein polarity of each magnet of the first plurality of magnets is the same as polarity of an adjacent magnet of the first plurality of magnets such that each magnet of the first plurality of magnets repels the adjacent magnet.

11. The assembly of claim 1, wherein the first end portion includes a hole to receive the connecting bar of the frame front.

12. The assembly of claim 1, further comprising a cover received in the channel, wherein the first plurality of magnets and the intermediate member are disposed between the bottom wall and the cover.

13. An eyeglass frame, comprising:
- a frame front having opposed first and second frame end portions;
- first and second endpiece assemblies pivotably attached to the fifth and sixth first and second frame end portions, respectively, wherein each of the first and second endpiece assemblies includes:
  - (a) an elongate body having a channel partially defined by an elongate bottom wall of the elongate body, the elongate body being adapted to be attached to, or formed with, a temple of the eyeglass frame,
  - (b) an intermediate member having first and second member end portions and a first central portion therebetween, the first central portion and the second member end portion being received in the channel and the first member end portion adapted to pivotably connect to a connecting bar of the frame front of the eyeglass frame, and
  - (c) a first plurality of magnets disposed within the channel and between the bottom wall and the first central portion and the second member end portion of the intermediate member; and
  - (d) first and second temples attached to, or formed with, an end of the elongate body of the first and second endpiece assemblies, respectively, wherein the first member end portion of the intermediate member of each of the first and second endpiece assemblies includes a hole that receives a corresponding connecting bar of the frame front, wherein the elongate body of each of the first and second endpiece assemblies includes third and fourth end portions and a second central portion therebetween, the third end portion including a hole and the second central portion having the channel, wherein the first member end portion of the intermediate member of each of the first and second endpiece assemblies is shaped as a hook, at least a portion of the hook being received in the hole of the third end portion, and wherein the first member end portion and the third end portion define an opening therebetween, the opening receiving a corresponding connecting bar of the frame front.

14. Eyeglasses, comprising the eyeglass frame of claim 13; and a pair of lenses attached to the eyeglass frame.

* * * * *